US012794541B2

(12) United States Patent
Lynch et al.

(10) Patent No.: US 12,794,541 B2
(45) Date of Patent: Nov. 10, 2026

(54) FRAME REPEATER

(71) Applicant: PERASO TECHNOLOGIES INC., Toronto (CA)

(72) Inventors: Bradley Robert Lynch, Toronto (CA); Jeffrey Andonieh, East Gwillimbury (CA)

(73) Assignee: PERASO TECHNOLOGIES INC., Ontario (CA)

(*) Notice: Subject to any disclaimer, the term of this patent is extended or adjusted under 35 U.S.C. 154(b) by 0 days.

(21) Appl. No.: 18/499,502

(22) Filed: Nov. 1, 2023

(65) Prior Publication Data

US 2024/0146390 A1 May 2, 2024

Related U.S. Application Data

(60) Provisional application No. 63/381,797, filed on Nov. 1, 2022.

(51) Int. Cl.
*H04B 7/155* (2006.01)
*H04L 12/66* (2006.01)

(52) U.S. Cl.
CPC ............. *H04B 7/155* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 2014/0177513 A1* | 6/2014 | Balasubramanian | ........................ | H04L 12/413 370/315 |
| 2019/0394643 A1* | 12/2019 | Townend | .............. | H04W 12/06 |
| 2022/0210007 A1* | 6/2022 | Wang | .................... | H04W 24/02 |

* cited by examiner

*Primary Examiner* — Jae Y Lee
*Assistant Examiner* — Nam P. Cao
(74) *Attorney, Agent, or Firm* — Perry + Currier Inc.

(57) ABSTRACT

A method includes: at a repeater device, implementing a network bridge between a first interface and a second interface of the repeater device; establishing a connection between the first interface and another communications controller of another computing device; establishing a further connection between the second interface and a further communications controller of a further computing device; and in response to establishing the further connection, initializing a virtual interface corresponding to the further communications controller.

12 Claims, 6 Drawing Sheets

FRAME REPEATER

CROSS-REFERENCE TO RELATED APPLICATION

The present application claims priority to U.S. Provisional Patent Application No. 63/381,797, filed Nov. 1, 2022, the contents of which is incorporated herein by reference in its entirety.

BACKGROUND

Enabling communication between local area networks (LANs), such as wired Ethernet networks in distinct buildings, can be achieved via the implementation of a wireless bridge, e.g., where a wired link between the networks is unavailable and/or impractical to install. However, wireless bridging of LANs typically involves implementing router functionality, e.g., at level 3 of the Open Systems Interconnection (OSI) model. Such routing functionality can involve processing overhead that can introduce additional latency in communications.

SUMMARY

Examples disclosed herein are directed to a method, comprising: at a repeater device, implementing a network bridge between a first interface and a second interface of the repeater device; establishing a connection between the first interface and another communications controller of another computing device; establishing a further connection between the second interface and a further communications controller of a further computing device; and in response to establishing the further connection, initializing a virtual interface corresponding to the further communications controller.

Additional examples disclosed herein are directed to a repeater device, comprising: a first wireless communications interface; a second wireless communications interface; and a processor configured to: implement a network bridge between the first wireless communications interface and the second wireless communications interface; establish a connection between the first wireless communications interface and another communications controller of another computing device; establishing a further connection between the second wireless communications interface and a further communications controller of a further computing device; and in response to establishing the further connection, initializing a virtual interface corresponding to the further communications controller.

DETAILED DESCRIPTION

Figure 1:
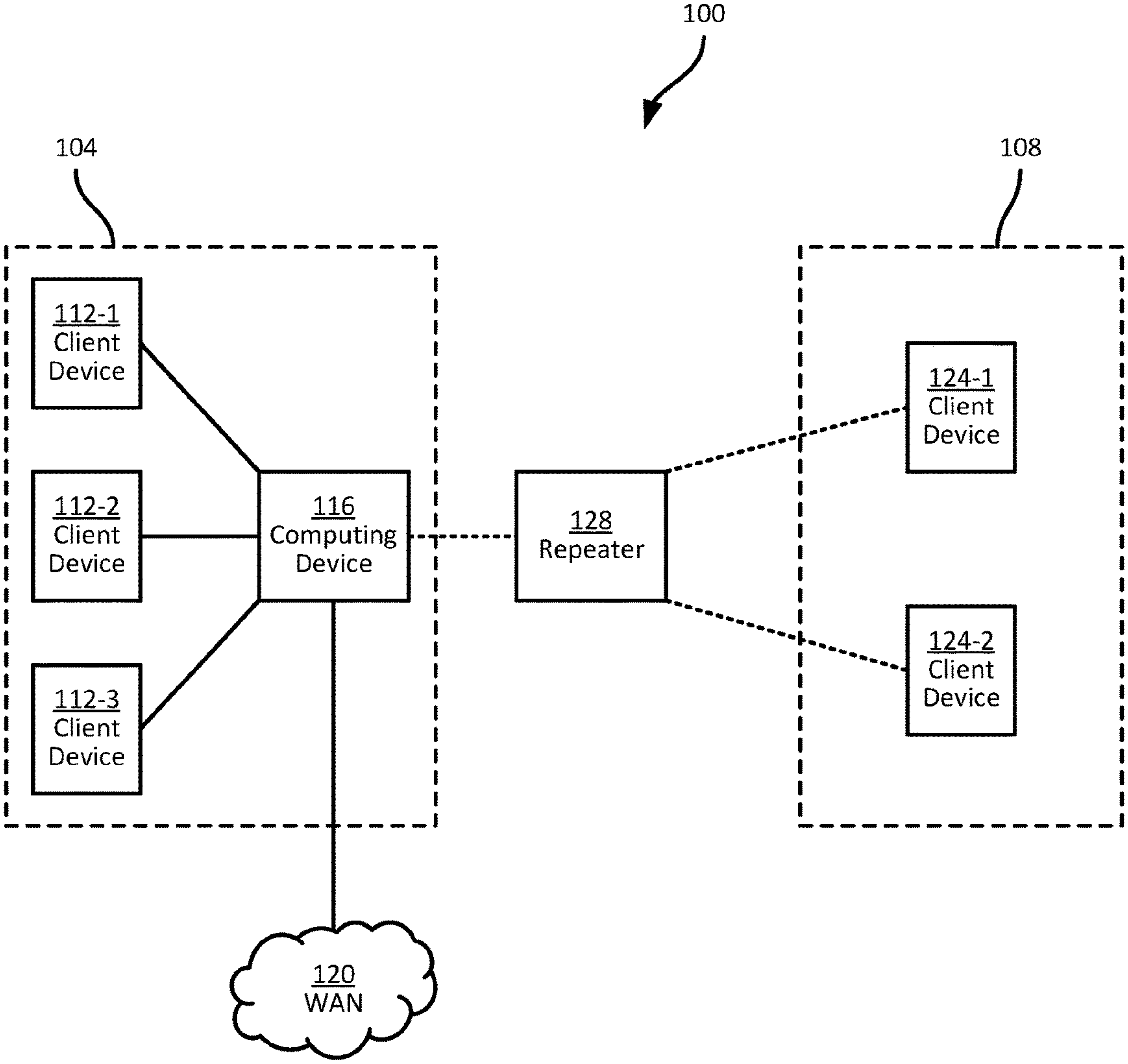
FIG. 1 is a diagram of a communications system.

FIG. 1 illustrates a communications system 100, distributed between two physical locations such as a first building 104 and a second building 108. The nature of the buildings 104 and 108 is not particularly limited, nor is the location of each building 104, 108 relative to the other. However, for the purpose of illustration, a wired communications link is not available between the buildings 104 and 108, and a direct wireless communications link (e.g., without intermediate infrastructure) between the buildings 104 and 108 is unavailable or at least impractical. For example, the buildings 104 and 108 may be separated by a sufficient distance as to render wireless communications unreliable, or structures between the buildings 104 and 108 may interfere with such a direct link. The buildings 104 and 108 need not be single structures, but can be portions of a campus or the like including multiple discrete buildings each, in other examples.

The first building 104 includes a local area network (LAN) connecting client computing devices 112-1, 112-2 and 112-3 (collectively referred to as the client devices 112, and generically referred to as a client device 112; similar nomenclature is used elsewhere herein for reference numerals with hyphenated suffixes) and a computing device 116. The client devices 112 and the device 116 can include any of a wide variety of computing devices, such as desktop computers, laptop computers, servers, and the like. The device 116 can implement a network distribution system (e.g., a switch or the like) interconnecting the devices 112). In this example, the device 116 includes a communications interface such as an Ethernet controller, having a set of hardware ports for connection to the client devices 112. The computing device 116 may also connect (e.g., via a further hardware port) to a wide area network (WAN) 120 which may include the Internet. The system 100 may include a router or other device connecting the device 116 to the WAN, but such a device is omitted from FIG. 1 for simplicity.

The second building 108 includes client computing devices 124-1 and 124-2, such as laptop computers, smartphones, or the like. The client devices 124 may be configured to access the WAN 120 via the device 116, and/or to access certain applications, data, or the like, within the LAN of the building 104 via the device 116. However, as noted above, the buildings 104 and 108 lack a wired communications link, and may be too distant from one another for a wireless network interface controller at the device 116 to communicate directly with wireless network interface controllers at the client devices 124. Therefore, as will be described below in greater detail, the system 100 also includes a repeater device 128 configured to establish wireless connections with the device 116, and with the client devices 124. The repeater 128 is configured to wirelessly bridge traffic between the buildings 104 and 108.

As will be apparent to those skilled in the art, wireless bridging typically involves implementing level-3 routing functionality, which can introduce latency to communications between the buildings 104 and 108 as a result of the increased complexity involved in routing messages between LANs. As discussed below, the repeater 128 implements certain functions that facilitate level-2 switching between the devices of the buildings 104 and 108, such that the client devices 112, the device 116, and the client devices 124, can communicate effectively as members of a single LAN. As will also be apparent in the discussion below, in some examples the functionality of the repeater 128 can be implemented in drivers, firmware, or the like, for wireless LAN (WLAN) interfaces of the repeater 128. Those WLAN interfaces can be deployed as discrete modules, such as Universal Serial Bus (USB) dongles or the like that can be connected to a computing device. The device 116, or any other device implementing a distribution system, can therefore also be equipped to perform certain functions performed by the repeater 128, to facilitate level-2 switching between distribution systems separated by wireless links.

Figure 2:
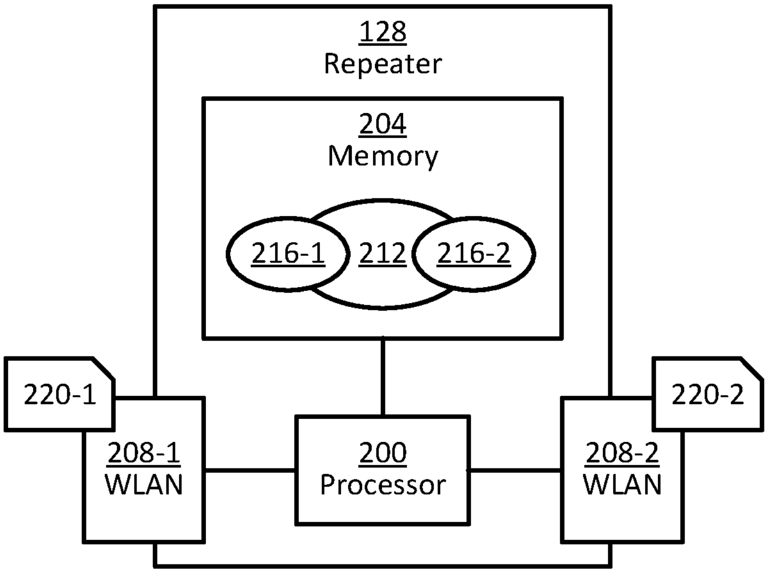
FIG. 2 is a diagram of certain internal components of a repeater of the system of FIG. 1.

Turning to FIG. 2, the repeater 128 is shown in greater detail, illustrating certain internal and/or physically connected components of the repeater 128. The repeater 128 can include a housing containing a central processing unit (CPU) 200 or other suitable microcontroller. The processor 200 is interconnected with a non-transitory computer readable storage medium, such as a memory 204 (e.g., any suitable combination of volatile and non-volatile memory components), having stored thereon various computer readable instructions. The instructions stored in the memory 204 are executable by the processor 200 for performing various actions.

The repeater 128 also includes a first WLAN network interface controller 208-1, and a second WLAN network interface controller 208-2, each connected with the processor 200. The WLANs 208 each include one or more antennas, baseband chips and/or other control circuits, as will be apparent to those skilled in the art. In some examples, the WLANs 208 are integrated with the repeater 128, e.g., supported within a housing of the repeater 128 and connected with the processor 200 via one or more internal buses. In other examples, either or both of the WLANs 208 can be implemented as discrete modules, for example interconnected with the processor 200 via respective USB controllers and hardware ports of the repeater 128.

The instructions stored in the memory 204 and executed by the processor 200 include, in this example, an operating system (OS) 212 or other suitable orchestration application, e.g., configured to implement a network bridge as discussed below. The instructions stored in the memory 204 for execution by the processor 200 also include a first driver 216-1 corresponding to the WLAN 208-1, and a second driver corresponding to the second WLAN 208-2. In other examples, depending for example on whether the WLANs 208 are integrated or separate modules (e.g., USB-based modules), the drivers 216 can be implemented on the respective WLANs 208, and/or functionality implemented by the drivers 216 can be shared between on-board controllers of the WLANs 208 and the processor 200.

Each WLAN 208 has, as will be apparent, a substantially unique media access control (MAC) address, e.g., a string of six octets stored in a read-only memory of the WLAN 208 itself. Thus, the WLAN 208-1 is illustrated as having a MAC address 220-1, and the WLAN 208-2 is illustrated as having a MAC address 220-2.

Via the operation of the WLANs 208 and execution of the OS 212 and drivers 216, the repeater 128 is configured to establish wireless connections with, for example, the device 116 and the client devices 124, in a manner that facilitates level-2 switching of traffic between the devices of the buildings 104 and 108. Through such connections, the LANs of the buildings 104 and 108 can therefore be interconnected wirelessly to behave as a single LAN, rather than as distinct LANs requiring level-3 routing for interconnection.

Figure 3:
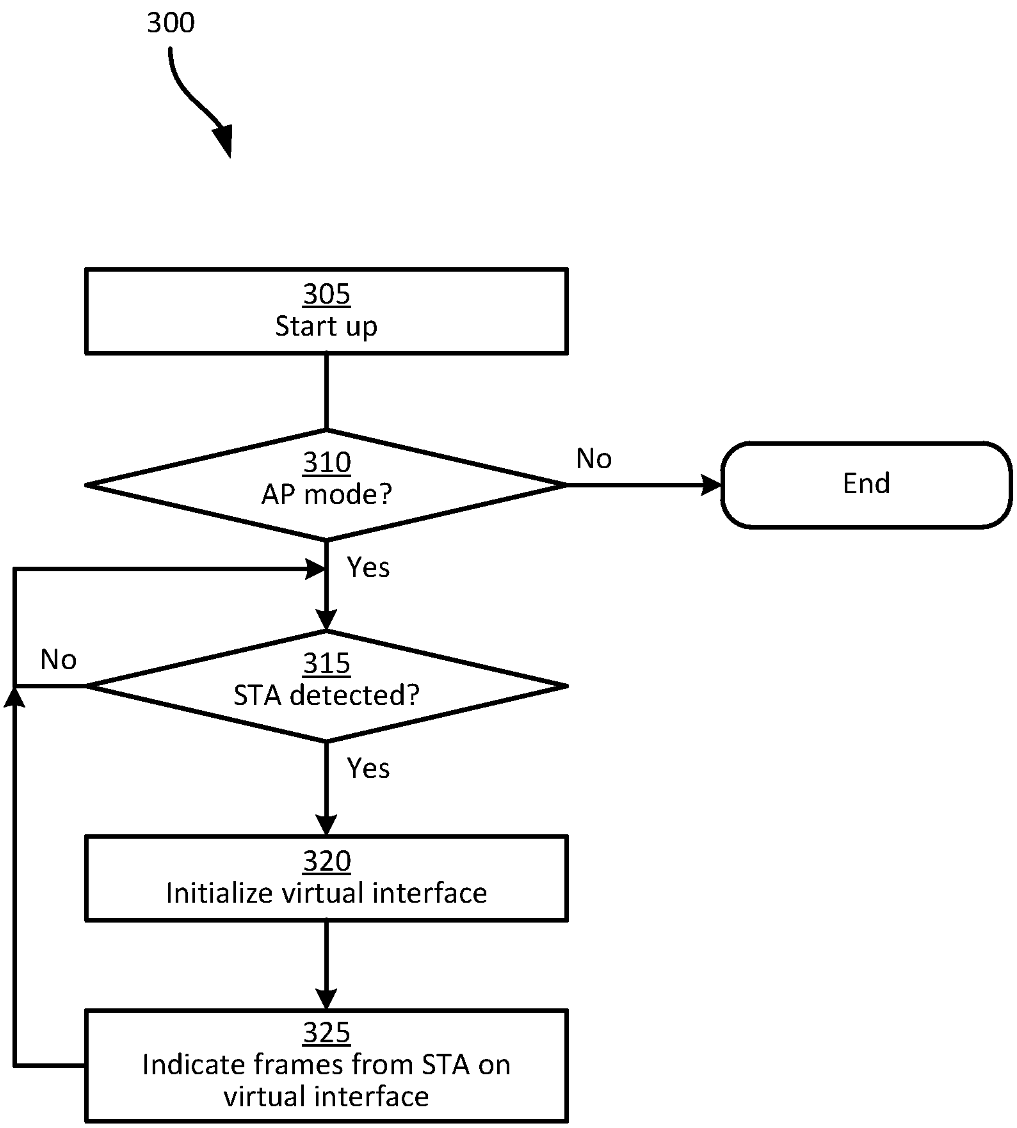
FIG. 3 is a flowchart of a method of configuring WLANs for wireless inter-network switching in the system of FIG. 1.

Turning to FIG. 3, a method 300 of configuring WLANs for wireless inter-network switching is illustrated. The method 300 can be performed by the repeater 128, e.g., via the execution of the OS 212 and drivers 216 by the processor 200. As will be discussed further below, certain other computing devices, such as the device 116, can also perform instances of the method 300 to facilitate wireless inter-network switching. At the repeater 128, the method 300 can be performed once for each WLAN 208.

At block 305, the processor 200 is configured to initialize the relevant WLAN 208, e.g., beginning execution of the corresponding driver 216. At block 310, the processor 200 is configured to determine whether the WLAN is operating in a station mode or an access point (AP) mode. The WLANs 208 can operate in either mode, and the choice of mode art block 310 can therefore be set in configuration data, determined by configuration of the devices 116 and 124, or the like. In this example, the device 116 includes a WLAN (whether integrated or deployed as a distinct module) that is configured as an access point. The WLAN 208-1 is therefore configured to operate as a station, the determination for the WLAN 208-1 at block 310 is negative. For the WLAN 208-1, performance of the method 300 can therefore end.

The devices 124, in this example, include WLANs (which may be integrated or deployed as distinct modules, such as USB modules) configured to operate in station mode. The WLAN 208-2 is therefore configured to operate in AP mode, and the determination at block 310 is affirmative. Following an affirmative determination at block 310, at block 315 the processor 200 is configured to await detection of a connection to a station. When a connection to a station, e.g., the client device 124-1, is detected, at block 320 the processor 200 is configured to initialize a virtual interface at the WLAN 208-2. The virtual interface initialized at block 320 corresponds uniquely to the station detected at block 315. At block 325, the processor 200 is configured to indicate frames from the station detected at block 315 on the virtual interface initialized at block 320, for switching to a destination via the WLAN 208-1. As will be apparent, the processor 200 is also configured to switch frames (e.g., received via the WLAN 208-1) addressed to the station detected at block 315 to the virtual interface initialized at block 320. The above process can be repeated for each station connected to the WLAN 208-2 (or, more generally, any WLAN at the repeater 128 that is operating in AP mode), such that the WLAN 208-2 maintains a number of active virtual interfaces equal to the number of stations connected to the WLAN 208-2.

Figure 4:
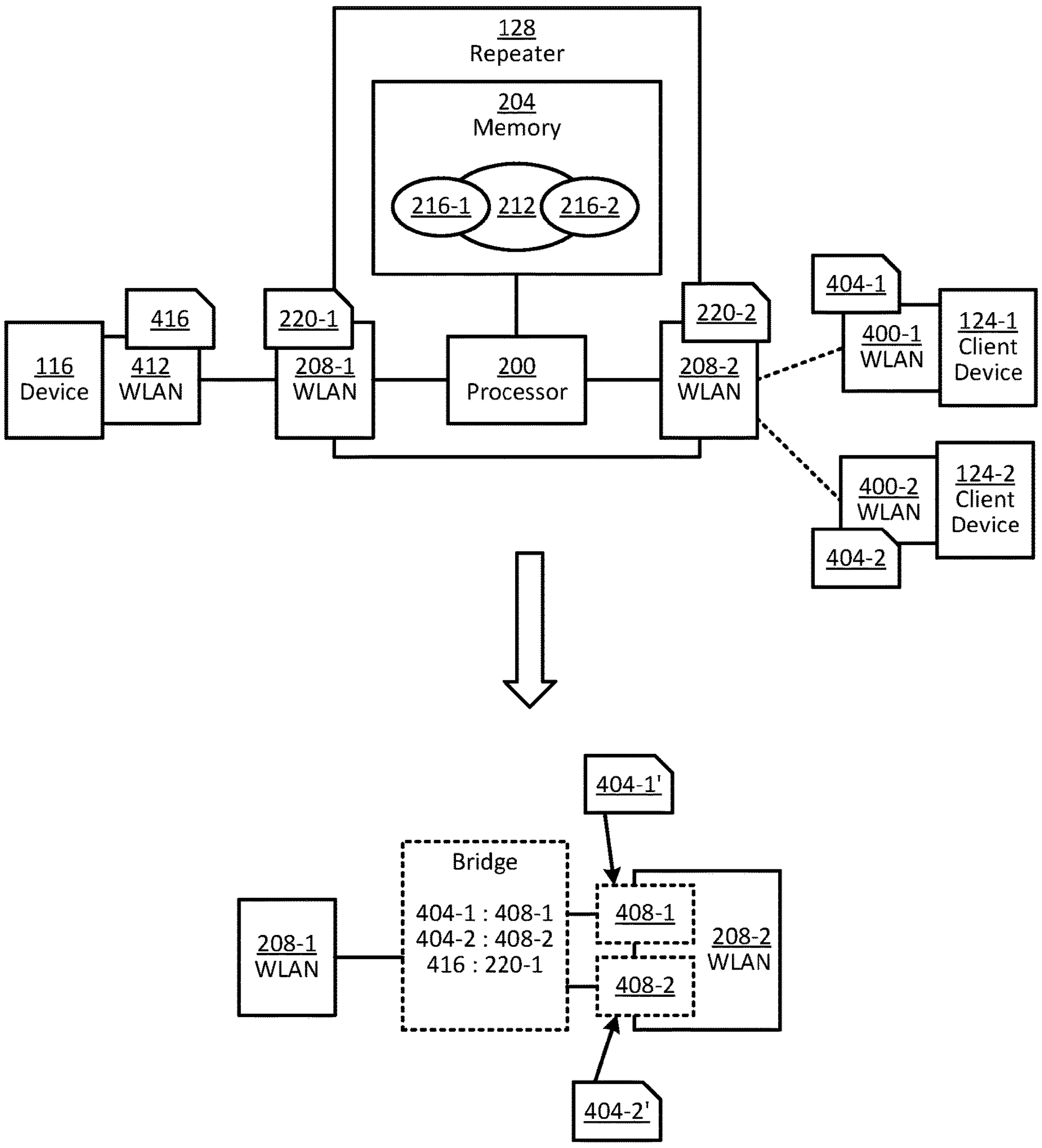
FIG. 4 is a diagram illustrating an example performance of the method 300.

Turning to FIG. 4, an example performance of the method 300 is illustrated for the WLAN 208-2. As noted above, the WLAN 208-2 operates in an AP mode (with the WLAN 208-1 operating in a station mode). The WLAN 208-2 is shown having established connections (e.g. based on a suitable member of the 802.11 family of standards, such as 802.11ad or extensions thereto) with the client devices 124-1 and 124-2. The client devices 124 include respective WLANs 400-1 and 400-2, which have respective MAC addresses 404-1 and 404-2. In response to establishing each wireless connection with a client device 124 (more specifically, with a station-mode WLAN 400), the repeater 128 initializes a virtual interface associated with the WLAN 208-2. As seen in the lower portion of FIG. 4, the repeater 128 therefore initializes two virtual interfaces 408-1 and 408-2, with corresponding MAC addresses 404-1' and 404-2'. The MAC addresses 404-1' and 404-2' correspond uniquely to the WLANs 400-1 and 400-2, respectively. For example, the MAC addresses 404-1' and 404-2' can be the same as the MAC addresses 404-1 and 404-2, with the exception of a local administration bit (e.g., set to '1' for the MAC addresses 404-1' and 404-2'). In other words, messages addressed to the WLANs 400 can be readily associated with the virtual interfaces 408.

The repeater 128 also implements a network bridge, e.g., with a forwarding table containing mappings between the MAC addresses 404-1 and 404-2, and the WLANs 408. Any frames received at the repeater 128 and addressed to, for example, the client device 124-1 (e.g., having the MAC address 404-1 as a destination) are switched to the virtual interface 408-1 for transmission to the WLAN 400-1. This also allows frames addressed to the client device 124-1 to be aggregated (e.g., into an Aggregated MAC Service Data Unit, or A-MSDU). Further, the provision of a single virtual interface for each station connected to the WLAN 208-2 enables the use of three-address headers, rather than four-address headers.

As will be apparent, frames sent from one of the client devices 124, e.g., the device client 124-1 (e.g., having the MAC address 404-1 as source) and addressed to the device 116 are received at the WLAN 208-2 and indicated on the virtual interface 408-1. The frames are then switched to the WLAN 208-1 for delivery (following aggregation, if implemented) to the device 116. For example, the device 116 can include a WLAN 412 (which can be integrated or provided as a USB or other suitable module) with a MAC address 416. As will be apparent, if the devices 112 are connected to the device 116 via an Ethernet interface, e.g., with each device 112 having a dedicated hardware port, the device 116 can implement bridging functionality to switch inbound messages to the relevant device 112 (and the bridge at the repeater 128 may include entries mapping each of the MAC addresses of the client devices 112 to the WLAN 208-1's MAC address 416).

Figure 5:
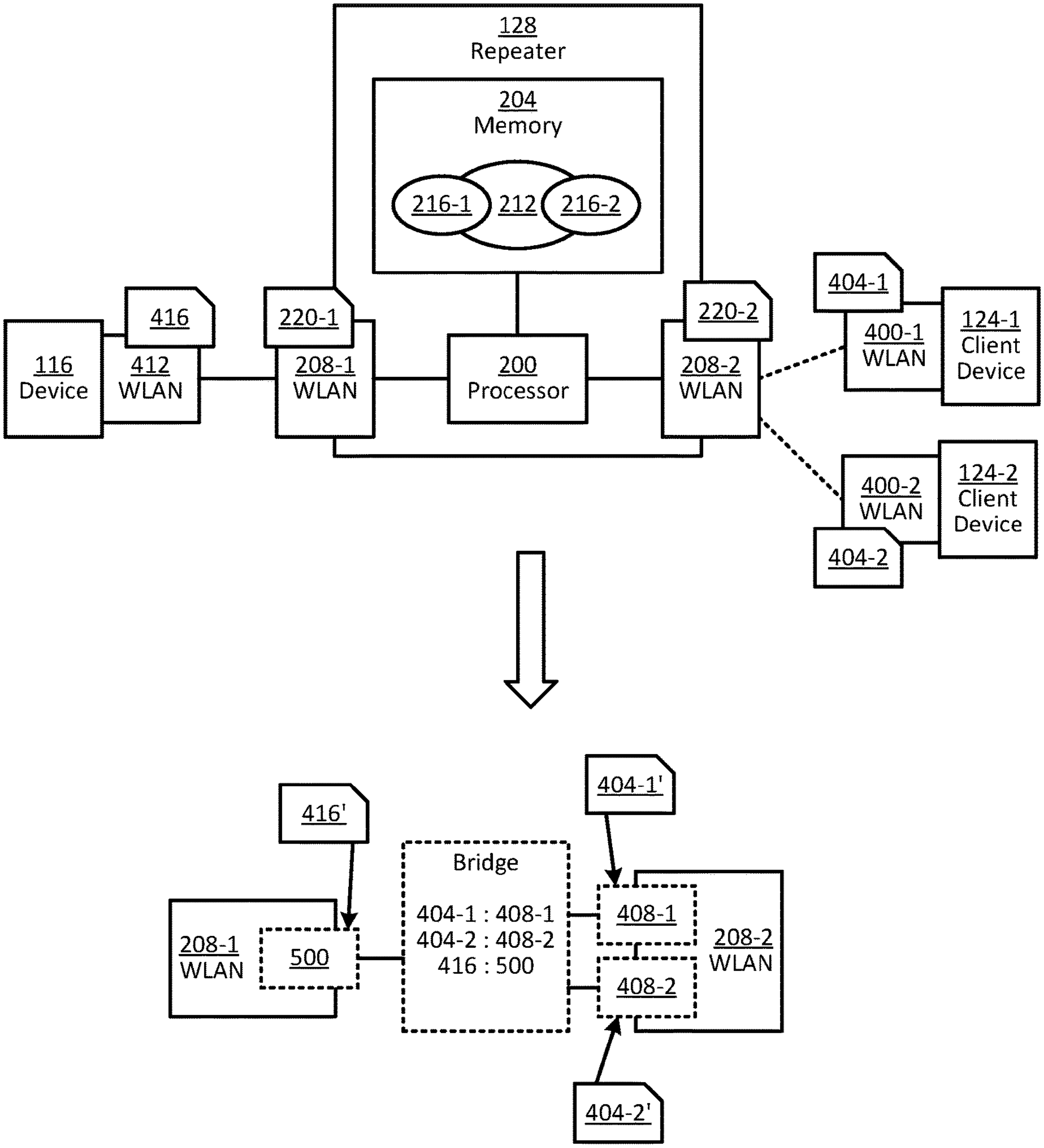
FIG. 5 is a diagram illustrating another example performance of the method 300.

In some examples, as shown in FIG. 5, the repeater 128 can also be configured to initialize a virtual interface for a WLAN operating in a station mode, with the virtual interface corresponding to an AP to which the WLAN is connected. For example, as illustrated in FIG. 5, in addition to the creation of the virtual interfaces 408, the repeater 128 can also be configured to initialize a virtual interface 500 with a MAC address 416', corresponding to the WLAN 412. In contrast to the MAC addresses 404-1' and 404-2', which can be substantially identical to the MAC addresses 404-1 and 404-2, the MAC address 416' can be generated, for example, by combining the MAC address 220-1 and the MAC address 416. For example, each of the last three bytes of the MAC address 416 can be summed with the corresponding one of the last three bytes of the MAC address 220-1, to produce the MAC address 416', which is unique to the pairing of the WLANs 208-1 and 412. This distinct addressing mechanism for an AP-mode WLAN reflects the fact that the WLAN 412 may itself act as a repeater, connecting wirelessly to further devices.

Figure 6:
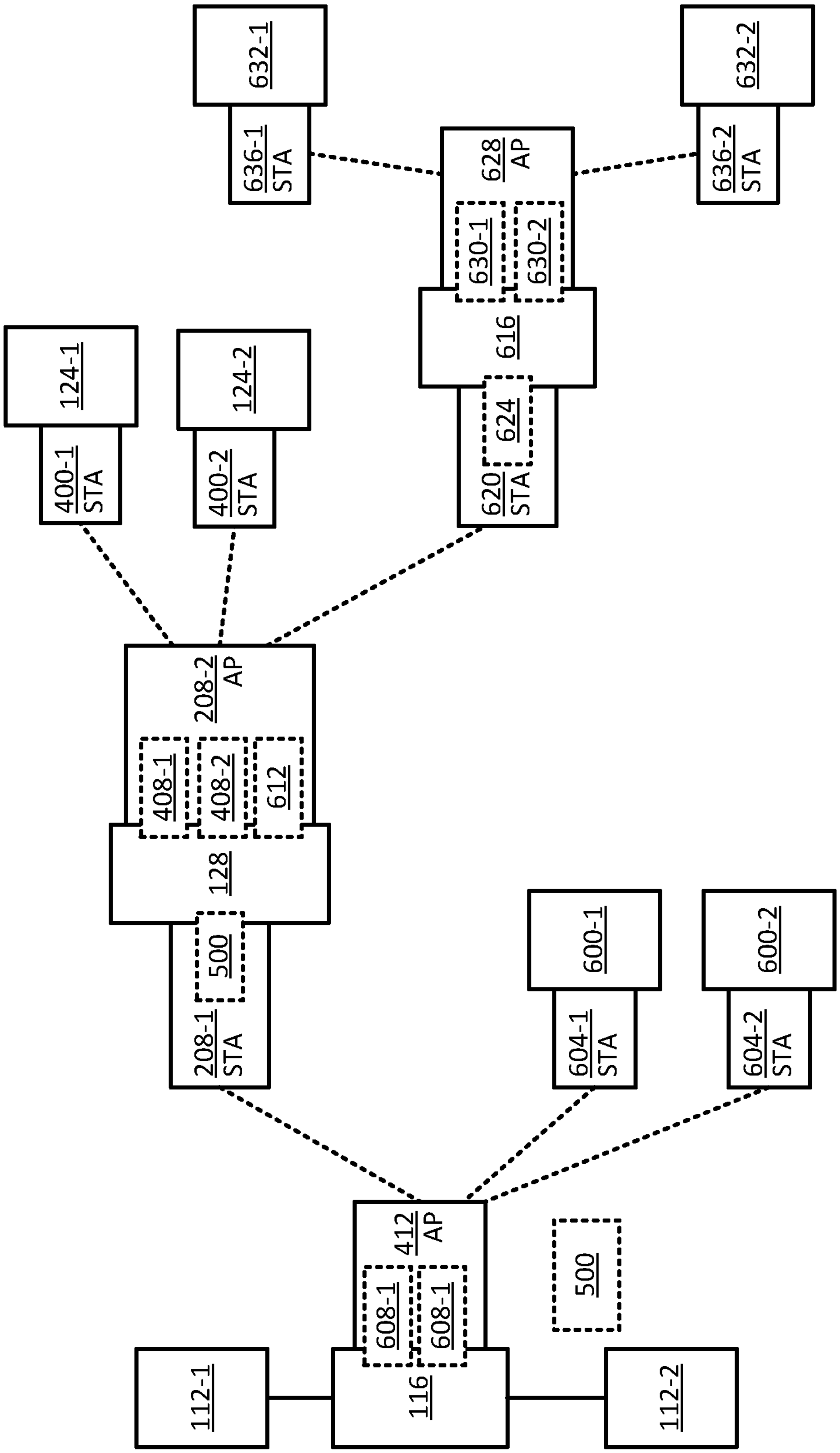
FIG. 6 is a diagram illustrating the implementation of the method 300 at several devices in a further communications system.

As will now be apparent, the geographic range of a WLAN can be extended via one or more repeaters, e.g., with devices such as the device 116 also operating as repeaters and implementing the method 300. Turning to FIG. 6, an expanded version of the system 100 is illustrated, in which the device 116, in addition to being connected with the devices 112 via Ethernet (the device 112-3 is omitted for space), is also connected wirelessly with the repeater 128 and two additional client devices 600-1 and 600-2 with respective WLANs 604-1 and 604-2 operating as stations. The device 116 initializes three virtual interfaces associated with the WLAN 412, specifically a virtual interface 608-1 corresponding to the WLAN 208-1 of the repeater 128, a virtual interface 608-2 corresponding to the WLAN 604-1, and a virtual interface 608-3 corresponding to the WLAN 604-2.

The repeater 128, in this example, initializes the virtual interfaces 500, 408-1, and 408-2 as mentioned earlier, as well as a virtual interface 612 corresponding to a further repeater 616 with a WLAN 620 and a virtual interface 624 corresponding to the WLAN 208-2. The repeater 616 further implements, in association with a WLAN 628, virtual interfaces 630-1 and 630-2 corresponding respectively to WLANs 636-1 and 636-2 of further client devices 632-1 and 632-2. As will be apparent, the creation of virtual interfaces establishing one-to-one relationships between stations and virtual interfaces can be performed at still further repeaters, e.g., to further extend the reach of the resulting network.

In some examples, rather than dynamically creating virtual interfaces corresponding to stations, the repeater 128 can maintain a predetermined set of virtual interfaces (e.g., a set of pre-generated virtual MAC addresses), and can activate or deactivate such interfaces in response to establishing connections with stations.

The scope of the claims should not be limited by the embodiments set forth in the above example, but should be given the broadest interpretation consistent with the description as a whole.

The invention claimed is:

1. A method comprising:

at a processor of a repeater device, implementing a network bridge between a first wireless network interface controller and a second wireless network interface controller of the repeater device;

establishing a wireless connection between the first wireless network interface controller and another communications controller of another computing device, the first wireless network interface controller configured to select one of a station mode and an access point mode to establish the wireless connection;

establishing a further connection between the second wireless network interface controller and a further communications controller of a further computing device, the second wireless network interface controller configured to select the other of the station mode and the access point mode to establish the further wireless connection; and in response to establishing the further connection, initializing a virtual interface at the repeater device, the virtual interface associated with the second wireless network interface controller and corresponding to the further communications controller.

2. The method of claim 1, wherein the second wireless network interface controller of the repeater device is configured to operate in the access point mode.

3. The method of claim 2, further comprising selecting an identifier of the virtual interface.

4. The method of claim 3, wherein selecting the identifier includes selecting the identifier from a predetermined set of virtual interface identifiers.

5. The method of claim 3, wherein selecting the identifier includes retrieving an identifier of the further communications controller, and generating the identifier based on the identifier of the further communications controller.

6. The method of claim 1, further comprising: directing frames addressed to the further communications controller via the virtual interface.

7. A repeater device, comprising:

a first wireless network interface controller;

a second wireless network interface controller; and a processor configured to:

implement a network bridge between the first wireless network interface controller and the second wireless network interface controller;

establish a connection between the first wireless network interface controller and another communications controller of another computing device, the first wireless network interface controller configured to select one of a station mode and an access point mode to establish the wireless connection;

establishing a further connection between the second wireless network interface controller and a further communications controller of a further computing device, the second wireless network interface controller configured to select the other of the station mode and the access point mode to establish the further wireless connection; and in response to establishing the further connection, initializing a virtual interface at the repeater device, the virtual interface associated with the second wireless network interface controller and corresponding to the further communications controller.

8. The repeater device of claim 7, wherein the second interface of the repeater device is configured to operate in the access point mode.

9. The repeater device of claim 8, wherein the processor is further configured to select an identifier of the virtual interface.

10. The repeater device of claim 9, wherein the processor is further configured to select the identifier by selecting the identifier from a predetermined set of virtual interface identifiers.

11. The repeater device of claim 9, wherein the processor is further configured to select the identifier by retrieving an identifier of the further communications controller, and generating the identifier based on the identifier of the further communications controller.

12. The repeater device of claim 7, wherein the processor is further configured to: direct frames addressed to the further communications controller via the virtual interface.

* * * * *